United States Patent Office 3,222,256
Patented Dec. 7, 1965

3,222,256
NUCLEAR FUEL ELEMENT WITH IMPROVED
END CAP ASSEMBLY
Frederick Owen Fletcher, Saughall, Chester, and Alan
Frederick Taylor, Lea, Preston, England, assignors to
United Kingdom Atomic Energy Authority, London,
England
Filed Mar. 16, 1962, Ser. No. 180,253
Claims priority, application Great Britain, Mar. 24, 1961,
10,974/61
2 Claims. (Cl. 176—79)

This invention relates to nuclear fuel elements and is concerned with nuclear fuel elements of the type comprising fissile material enclosed in a tubular sheath, each end of the sheath being closed by an end cap sealed to the sheath by edge-welds. Such a nuclear fuel element is hereinafter referred to as "of the type described."

Great Britain Patent No. 790,389 discloses a nuclear fuel element of the type described and shows the end caps of the fuel element sealed to the sheath by edge-welds. During manufacture of these fuel elements, rigid examination is made to determine if leaks or flaws exist in the edge welds. Despite this examination, it has been found that, after irradiation in the core of a nuclear reactor, leaks have nevertheless been discovered in the edge-welds and it has been deduced that a contributing cause of the leaks has been mechanical damage imposed on the fuel elements during their loading into the reactor core.

According to the present invention, a nuclear fuel element of the type described is characterised in that each end cap seal is enclosed by a shroud member sealed to the sheath by an edge-weld and that the part of the sheath and the part of the shroud member adjacent said edge-weld project radially by at least the amount of projection of the edge-weld.

Figure 1:
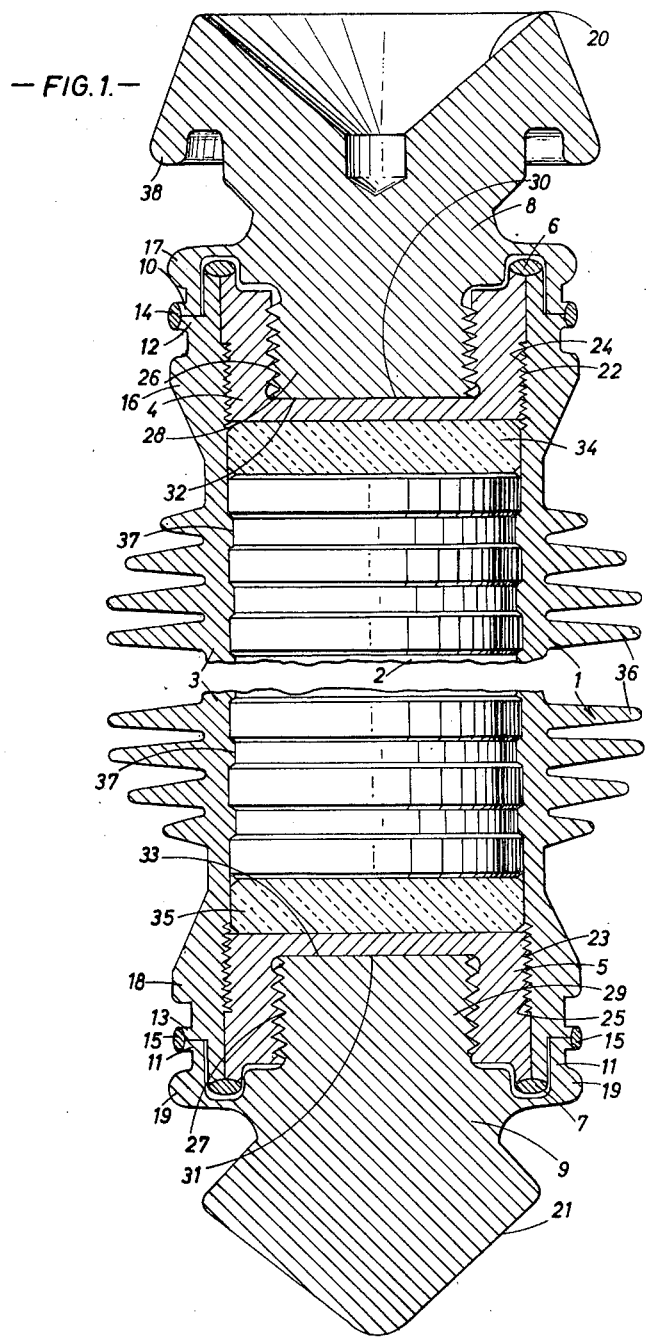

An embodiment of the invention will now be described by way of example with reference to the accompanying drawings wherein:

FIGURE 1 is a part-fragmentary side view in medial section and

Figure 2:
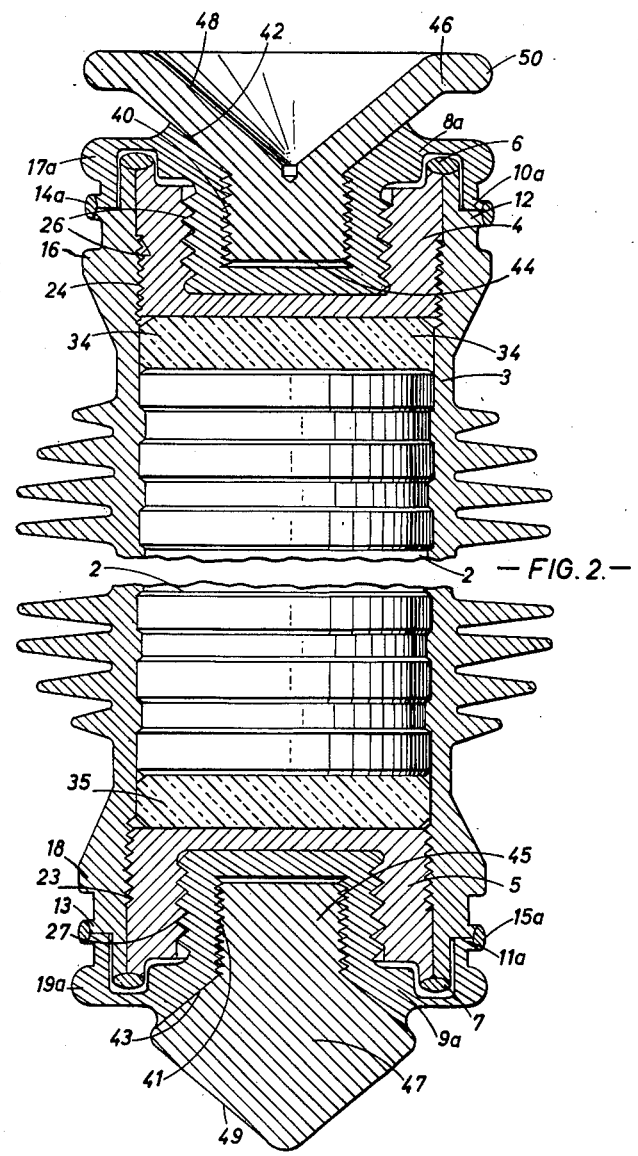

FIGURE 2 a modification thereof.

Referring to FIGURE 1, a nuclear fuel element 1 includes a rod 2 of natural uranium contained in a tubular sheath 3, the ends of the sheath 3 being closed by end caps 4, 5 sealed to the sheath by edge-welds 6, 7. The welds 6, 7 are applied by the argon-arc process and are enclosed by shroud members 8, 9 having external flanged parts 10, 11 abutting with complementary flanged parts 12, 13 formed in the ends of the sheath 3 and sealed thereto by circumferential edge-welds 14, 15 also applied by the argon-arc process. Annular ridges 16, 18 and 17, 19 respectively of the sheath 3 and shroud members 8, 9 and adjacent the edge-welds 14, 15 project radially by an amount equal to the amount of radial projection of the edge-welds 14, 15.

In greater detail, the sheath 3, end caps 4, 5 and shroud members 8, 9 are of magnesium alloy. The shroud member 8 has a cup-like recess 20 and the shroud member 9 a complementary cone-like projection 21, to allow a column of fuel elements 1 to be end-stacked one upon another in a fuel channel of a reactor core.

The ends of the sheath 3 have screw-threaded portions 22, 23 and the end caps 4, 5 complementary screw-threaded portions 24, 25. In the event of the sheath 3 and end cap 4, 5 expanding at different rates when in use, the resulting differential strains are sustained by the interaction of screw threads 22 with 24 and 23 with 25 rather than by the edge welds 6, 7. The screw threads accept strains caused by expansion of the rod 2 and thereby relieve the edge-welds 6, 7. The end caps 4, 5 also have screw-threaded recesses 26, 27 which locate screw-threaded plug parts 28, 29 of the shroud members 8, 9. The shroud members 8, 9 are screwed into the end caps 4, 5 until end-faces 30, 31 of the parts 28, 29 abut with end-faces 32, 33 on the end caps 4, 5. The screw threads between the end caps 4, 5 and the shroud members 8, 9 thus relieve the edge-welds 14, 15 from stresses created by expansion of the rod 2 and transmitted through the end caps 4, 5 in a similar way to that described for screw threads 22, 23, 24 and 25.

The ends of the rod 2 are spaced from the end caps 4, 5 by heat insulating discs 34, 35 of alumina. The sheath 3 is formed with helical heat transfer fins 36.

The rod 2 is a close fit within the sheath 3 and has a series of circumferential grooves 37 along its length into which the sheath 3 is indented (by applying an external fluid pressure during the final stages of manufacture of the fuel element 1). Keying of the sheath 3 and rod 2 in this way limits creep in the sheath when the fuel element experiences thermal cycling in a nuclear reactor.

The fuel element is handled by its upper end and the the shroud member 8 is provided with an annular projection 38 for engagement by a fuel element grab. The screw threads between the end caps 4, 5 and shroud members 8, 9 also ensure that lifting forces are not applied to the edge-welds 6, 7, 14 and 15.

The shrouds 8, 9 provide protection of the edge-welds 6, 7 during loading of the fuel element 1 into the reactor core, and, with the edge-welds 14, 15 a secondary sealing of the fuel element 1. The parts 16, 17, 18, 19 extending radially to the outer peripheries of the "secondary" edge-welds 14, 15 provide a substantial measure of protection to these edge-welds during the loading operations and thus preserve the integrity of this secondary sealing.

FIGURE 2 shows a modified fuel element wherein the edge-welds 6, 7 are enclosed by shroud members 8a, 9a with external flanged parts 10a, 11a, sealed to the flanged parts 12, 13 of the sheath 3 by circumferential edge-welds 14a, 15a. Annular ridges 17a, 19a of the shroud members 8a, 9a project radially by an amount equal to the radial protection of the edge-welds 14a, 15a to provide, with the annular parts 16, 18 the sheath 3, a substantial measure of protection to the welds 14a, 15a.

The shroud members 8a, 9a have screw threaded sockets 40, 41 with conical openings 42, 43 which accommodate screw-threaded plug parts 44, 45 of fuel element end terminations 46, 47. The end termination 46 has a cup-like recess 48 and the end termination 47 a complementary cone-like projection 49 for end-location of a stack of fuel elements in a fuel channel of a reactor.

The shroud member 46 has a flanged portion 50 for engagement by a fuel element grab. The space available for the claws of the grab is less than that available in the fuel element of FIGURE 1 but this can be overcome by suitable design of a grab.

We claim:
1. A nuclear reactor fuel element comprising fissile material enclosed in a tubular sheath, each end of the sheath being closed by an end cap sealed to the sheath by a first circumferential edge weld, screw threads defined between and joining mechanically each of said end caps and said sheath, a shroud member at each end of the element enclosing each of said first edge welds and joined to the sheath by a second circumferential edge weld and to the end cap by screw threads, and a circumferential ridge adjacent the second circumferential edge members, said circumferential ridges projecting radially by at least the amount of projection of the edge weld.

2. A nuclear fuel element as claimed in claim 1 wherein the shroud members each have a circumferential flange weld on each end of the sheath and on each of said shroud abutting a complementary flange on the sheath and said flanges are sealed together by said second circumferential edge welds.

References Cited by the Examiner
FOREIGN PATENTS

| | | |
|---|---|---|
| 213,799 | 3/1958 | Australia. |
| 226,454 | 1/1960 | Australia. |
| 1,217,058 | 12/1959 | France. |
| 845,913 | 8/1960 | Great Britain. |
| 852,644 | 10/1960 | Great Britain. |

CARL D. QUARFORTH, *Primary Examiner.*
REUBEN EPSTEIN, *Examiner.*